Figure 1:
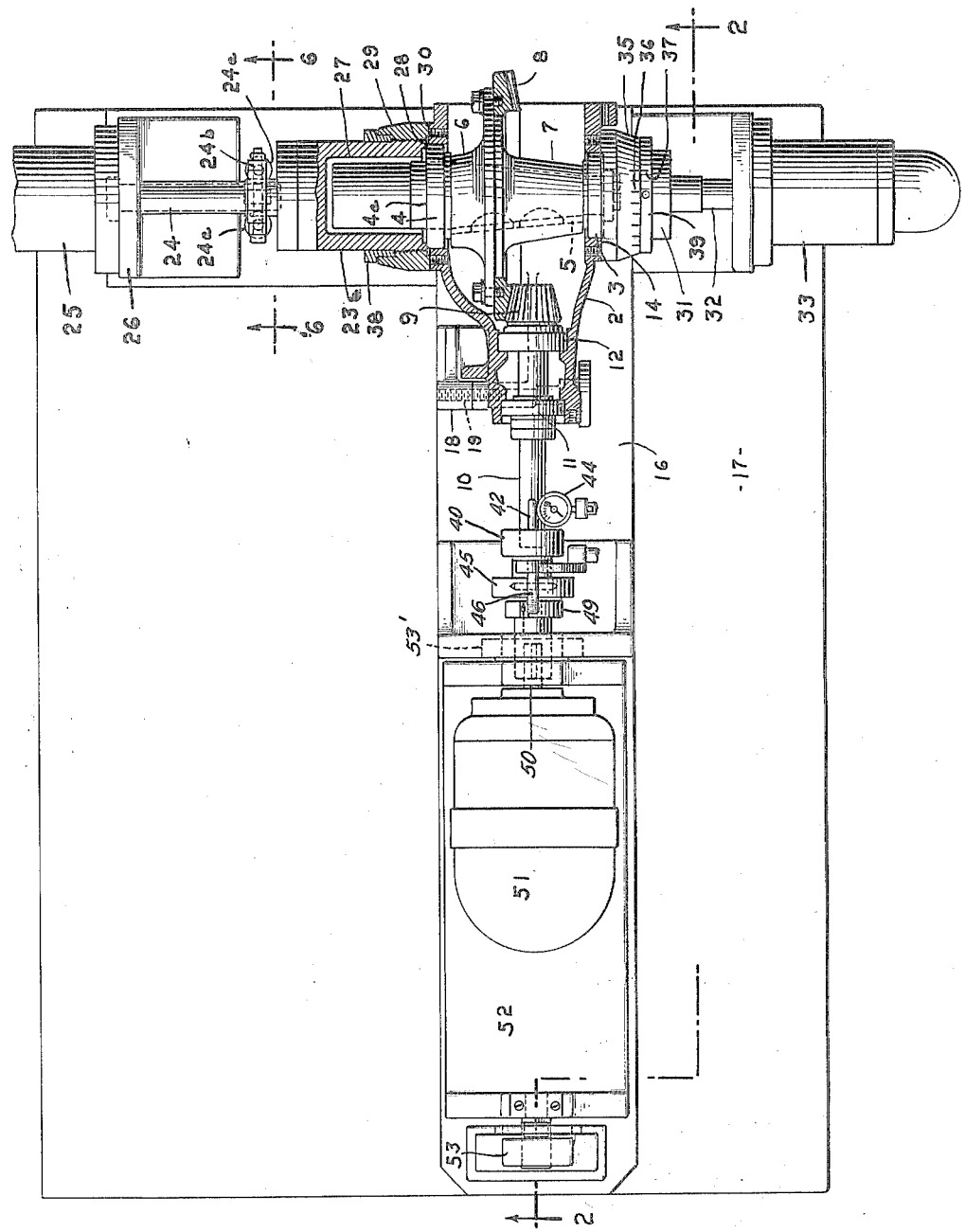

Aug. 7, 1956  E. A. WARREN  2,757,537
GAUGING AND TESTING MECHANISM
Filed Dec. 29, 1953  3 Sheets-Sheet 1

INVENTOR
Earl A. Warren
By Richard E. Babcock Jr.
ATTORNEY

Aug. 7, 1956 E. A. WARREN 2,757,537
GAUGING AND TESTING MECHANISM
Filed Dec. 29, 1953 3 Sheets-Sheet 2
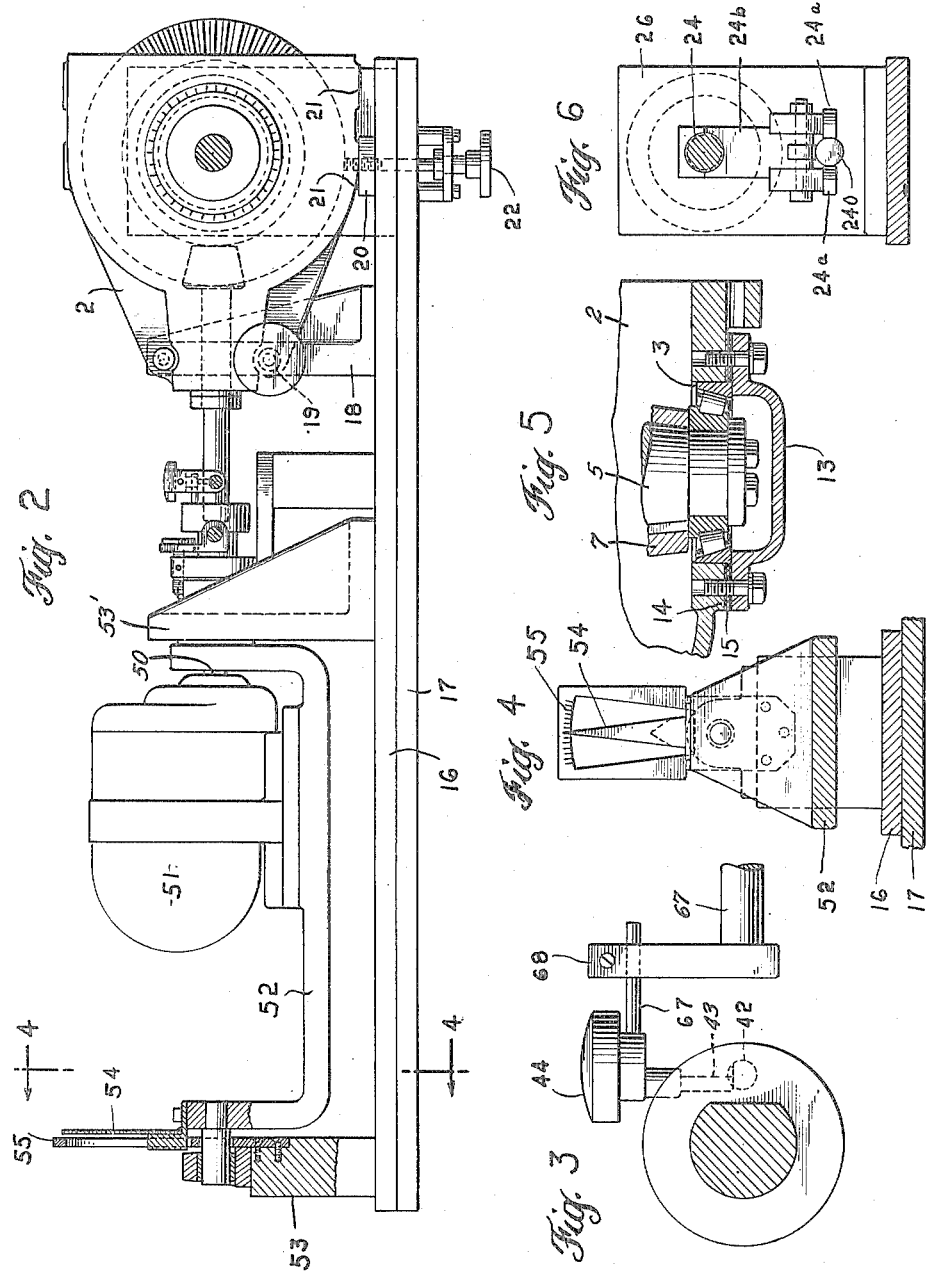
INVENTOR
Earl A. Warren
By Richard E. Babcock Jr.
ATTORNEY United States Patent Office 2,757,537
Patented Aug. 7, 1956

2,757,537

GAUGING AND TESTING MECHANISM

Earl A. Warren, Lancaster, Pa., assignor, by mesne assignments, to Sperry Rand Corporation, New Holland, Pa., a corporation of Delaware Application December 29, 1953, Serial No. 400,833

9 Claims. (Cl. 73—162)

This invention relates to a gauging and testing machine designed for use in accurately locating intermeshing beveled gears in proper relative positions within a gear box or other enclosure. Generally speaking, the present invention constitutes an improvement of the machine disclosed in the United States Patent 1,233,014 of July 10, 1917, to W. C. Baker.

Machines such as exemplified in the foregoing patent provide means for determining and measuring the proper relative positions of intermeshing beveled gears in order to attain the proper back-lash setting and intermeshing relationships of said gears. Such adjustments and measurements, however, are made before placing the gears within a gear box or enclosure, and it is necessary after ascertaining the proper relative positions of the gears and obtaining the measurements to re-establish the gears in these positions, to then separately measure the gear box and calculate the proper corrections to be made in thereafter assemblying the gears in the gear box. Moreover, such prior gauging and testing machines have provided no means whereby the thrust bearings supporting the gear shaft or shafts may be placed under a normal operative thrust load and tested while under such load. Obviously, such loading of the bearings, which are customarily axially fixed on and determine the axial position of the gear shaft, may substantially effect the axial position of the gear on said shaft.

The present invention has been conceived with the foregoing in mind and has for a primary object the provision of a machine which permits determination of the correct operative position of a gear, as determined by the positions of its shaft supporting bearings with respect to position-fixing abutments or reference surfaces on the gear box, while such gear is assembled in its cooperating gear box or enclosure in cooperative relationship with another gear or pinion.

It is a further important object to permit determination of such correct position and testing of the gear back-lash while maintaining the gear shaft supporting bearings under a thrust load equivalent to that desired in the assembled gear box.

Moreover it is an object to provide means for gauging the positions of the bearings as finally adjusted and while under a predetermined operating thrust load as above mentioned, as is necessary for the purpose of efficiently maintaining said bearings and their associated gear shaft and gear in proper position in the finally assembled gear box.

Also, it is an object to provide such a machine which will indicate by direct measurement and without necessity for calculation, the correct thickness of shims or washers to be interposed between the gear box and bearing caps in order to properly load and position the gear shaft bearings as required to accurately position the gear on said shaft relative to a cooperating gear or pinion.

The foregoing ends are achieved by a mechanism including a workholder for fixedly positioning the gear box during the gauging and testing operation, bearing adjusting and loading rams, respectively, being disposed on opposite sides of the workholder for relatively aligned movement. Means are provided for urging the loading ram toward the adjusting ram and thus into operative axial engagement with one of the shaft bearings with a predetermined constant degree of thrust such as is necessary to properly axially load the bearings. The adjusting ram, which will have been operated first in order to axially adjust the other of the gear shaft bearings to a trial position has means associated therewith for urging the adjusting ram toward the preloading ram with a degree of thrust which is greater than that of the loading ram so that the subsequently actuated loading ram may not dislocate the bearings from their axial adjustment determined by the adjusting ram. The extent of adjustment caused by the adjusting ram may be regulated through a given range by suitable gauge means associated with the adjusting ram and projecting axially in advance thereof to abut against the gear box or enclosure and thus limit the adjusting movement of the adjusting ram as desired. By adjusting the axial position of the gear through adjustment of its bearings as aforementioned and loading thereof, it will be seen that the amount of free-play or back-lash between the intermeshing gears may be tested in various relative positions of the gears, and while the gear shaft supporting bearings are loaded. By thus adjusting and testing it is possible to obtain an adjustment in which the amount of gear back-lash is within the proper range. Following this the gauge means on the adjusting gauge may be read, it being understood that such gauge will be calibrated to indicate the thickness of shims necessary to be interposed between the gear box and the bearing cap or cover for the bearing engaged by said adjustable adjusting ram in order to maintain the desired axial position of said bearing. A similar gauge means associated with the loading ram may indicate the thickness of shims necessary to be interposed between the bearing cap and the bearing engaged by said loading ram in order to maintain the desired position of this bearing.

Additional features and objects of the invention consist in the provision of a novel back-lash gauge mechanism for indicating the extent of back-lash or free movement between cooperating gears in any of their adjusted positions; in the novel arrangement employed for rotating the smaller gear or pinion for testing in different positions of mesh with its cooperating gear; in the provision of a novel clutch means for controlling rotation of one of the gears; and in a novel arrangement employed for retracting the back-lash gauge out of the path of its cooperating actuating means to prevent damage to said gauge when the gears are rotated.

Figure 7:
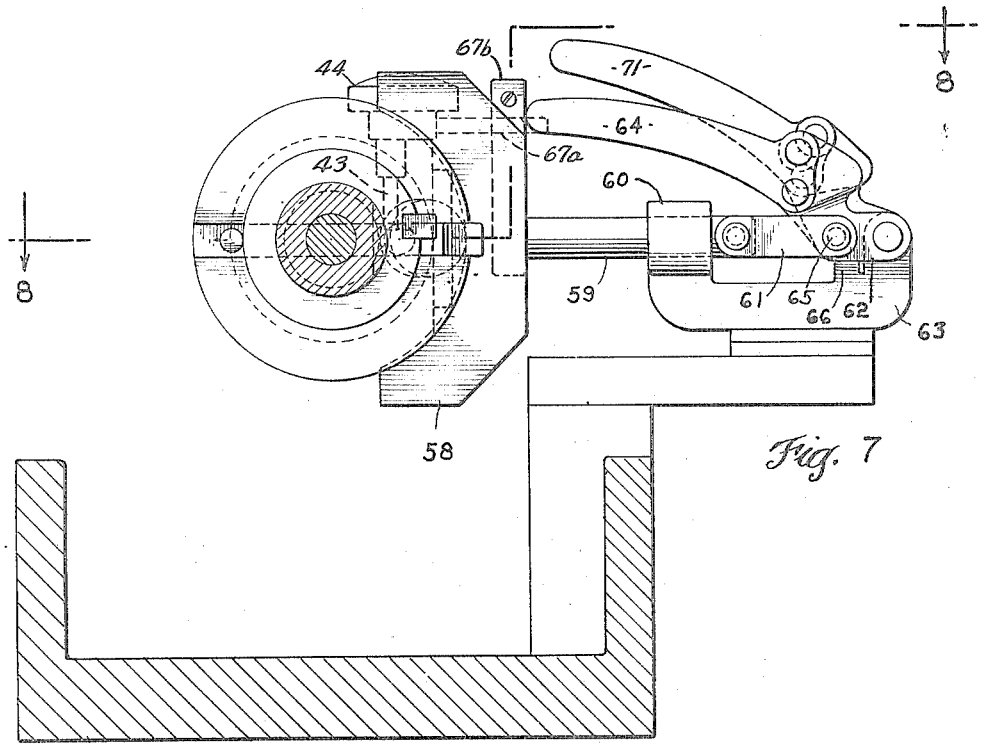
Figure 8:
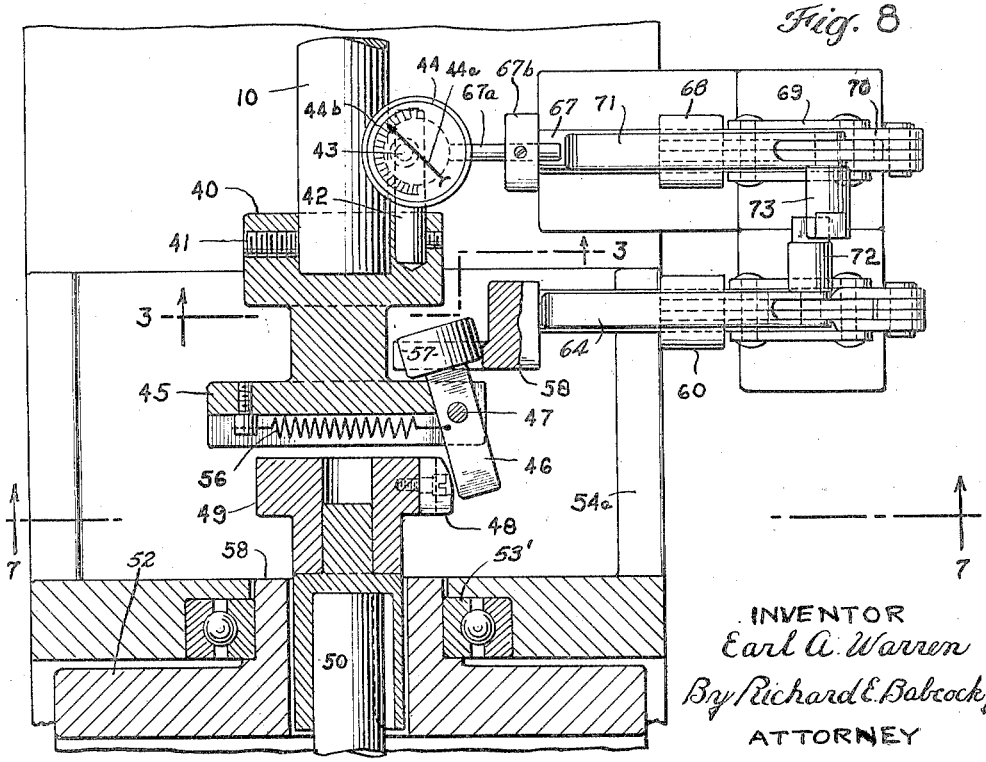

The foregoing objects and advantages are all attained by the preferred embodiment of the invention illustrated in the accompanying drawings in which:

Figure 1 represents a plan view of a gauging and testing machine in accordance with the invention having a gear box or housing operatively positioned therein, portions of the gear box and the adjoining machine structure being broken away to indicate the internal structure thereof;

Figure 2, a cross-section on the line 2—2 of Figure 1; looking in the direction of the arrows;

Figure 3, an enlarged sectional view on the line 3—3 of Figure 8;

Figure 4, a cross-section on the line 4—4 of Figure 2;

Figure 5, an enlarged fragmentary cross-section in an axial plane of one of the gear shaft bearings showing portions of the associated gear box structure, bearing cover or cap and the shims or washers interposed between the cap and gear box to maintain the bearing in proper axial and loaded position as determined through operation of the invention;

Figure 6, a cross-section on the line 6—6 of Figure 1;

Figure 7, a cross-section on an enlarged scale relative to Figure 1, taken on the line 7—7 of Figure 8; and, Figure 8, a similarly enlarged cross-section on the line 8—8 of Figure 7.

The drawings herein have been made from an actual embodiment of the measuring and testing machine which has been successfully used in a hay baler assembly line for gauging and testing the gear boxes and components as employed for transmitting power to the reciprocating plungers of hay balers. Accordingly, the invention will be hereinafter described in its preferred adaptation for this particular use, though it will be appreciated that it is by no means restricted to this special use, but is capable of general use in the measuring and testing of beveled gear assemblies, and their associated supporting bearings.

Referring now in detail to the accompanying drawings and first considering Figure 1 thereof, the reference character 2 designates a gear box or enclosure of the general type or class on which the invention is adapted for use. Rotatably supported on bearings 3 and 4 in opposite side walls of said housing 2 is a through shaft 5 on which are keyed the mating hub members 6 and 7 of a beveled gear 8. Beveled gear 8 is disposed in operative meshing relation with a beveled gear or pinion 9 fixed on shaft 10 which is rotatably supported in bearings 11 and 12 which also serve to fix the axial position of the shaft and gear 10 and 9 respectively in housing 2.

In accordance with usual practice relative adjustment of these gears 9 and 8 in order to accurately position them in cooperative relationship and to place them in the proper relative positions is attained by movement of the gear 8 and its supporting shaft toward or away from the rotational axis of the gear or pinion 9. In actual practice, this is accomplished by axially adjusting the gear 8, its supporting shaft 5, and bearings 3 and 4 respectively as a unit within the housing or gear box 2. For this reason it will be noted that the respective bearings 3 and 4 are located in definitely axially fixed positions with relation to the hub members 6 and 7 of the gear 8 as by being press-fitted on the shaft 5 with their inner cones or races in end-wise abutting relation with the respective hub members, as is shown in Figure 5 of the drawings.

In the assembled gear box structure the axial position of the respective bearings 3 and 4 and thus of the gear 8 is maintained by means of bearing caps or covers 13, such as exemplified in Figure 5, which abut against the outer faces of the outer bearing races and are relatively spaced from the immediately surrounding face 14 of the gear box by means of shims or washers 15 interposed between the cap 13 and surface 14 in proper thickness to maintain the desired axial position of the bearing 3. In addition to their function of accurately positioning the gear shaft 5 through its supporting bearings, the bearing caps or covers 13 illustrated in Figure 5 perform the further important function of applying a predetermined axial load or thrust against the outer bearing races within a predetermined range such as will prevent relative axial displacement of the gear 8 from its pinion 9 in operation under a load. Such loading or preloading of the bearings may also be of sufficient extent to perform this locating function even after the bearings 3 and 4 have become worn in actual use. Such a gear box 2 and the manner above described of properly adjusting and interrelating its component parts are old and well known in the art and, therefore, constitute no part of the present invention, but are thus referred to simply in order to promote an intelligent understanding of the invention. While the assembling, adjusting and loading or preloading of the gear shaft bearings 3 and 4 have in the past been performed largely manually, either with completely trial and error methods, or with the assistance of measuring mechanisms such as disclosed in the above-identified Baker patent, no satisfactory way has heretofore been available for properly and accurately assembling the co-operating beveled gears and their supporting bearings in operative relationship within a gear box. The present invention comprises such a machine.

The machine comprises a supporting base 16 fixed on a horizontal support 17 and is provided with a suitable positioning means for securing a gear box against movement in proper operative relation thereon. In the present embodiment such means comprises a standard 18 fixed on the base 16 and having a vertical face provided with threaded bores to receive attaching screws such as 19 which extend through suitable attaching portions of the gear box 2 and fixedly clamp same against the vertical face of the standard 18. The positioning means also includes a block 20 shown in Figure 2 having a horizontal upper surface for engagement with one of the positioning surfaces 21 of the gear box. A screw 22 threaded upwardly through the supporting surface 17, base 16 and block 20 serves to temporarily secure the gear box against both lateral and vertical displacement of the block 20. It will thus been seen that the positioning means of the instant embodiment are arranged to cooperate with the means incorporated in the gear box 2 for securing same in operative relation on the machine or mechanism of which it is to form a part and accordingly, that the positioning means may assume varying forms within the scope of the invention.

When the gear box 2 is positioned on the base 16 as shown, the shaft 5 and supporting bearings 3 and 4 will already have been assembled in the gear box 2 in positions which generally approximate their assembled operative positions.

Located on one side of the positioning means for movement in alignment with the shaft 5 of a gear box positioned therein is an adjusting ram 23 having a supporting piston rod 24 operatively associated with a piston (not shown) disposed for movement responsive to fluid pressure in a cylinder 25 which as shown is supported on a bracket 26 on the base 16. The fluid pressure within the cylinder 25 may be controlled through usual means (not shown) to either project the ram 23 toward or retract it from engagement with the bearing 4. In the embodiment shown the ram 23 is formed with a socket 27 opening in an endwise direction to receive the adjacent end of the laterally projecting shaft 5 and the annular end face 28 of the ram is proportioned and positioned to engage only the outer race or cone of the bearing 4 engaged thereby.

Thus by thrusting axially against the outer race of the bearing 4 the adjusting ram 23 may move both bearings 3 and 4, the shaft 5, and gear 8 as a unit, it being noted that both the bearings 3 and 4 and the ring gear 8 are axially fixed on the shaft 5.

The axial adjustment of the bearing 4 is limited by suitable gauge or stop means 29 consisting of a sleeve threaded externally on the ram 23 and projecting in advance thereof for abutting engagement with a reference surface or plane 30 surrounding the bearing 4 on the gear box 2. The axial distance to which the gauge 29 is advanced relative to the operative face 28 of ram 23, will, of course, determine the adjusted position of bearing 4.

Preferably the piston rod 24 of ram 23 will be guided by rollers 24a supported in a bracket 24b.

Disposed on the opposite side of the work positioning means from ram 23 for movement in alignment therewith is a loading ram 31 carried by piston rod 32 of a piston guided for reciprocation in a pneumatic cylinder 33 for movement toward or away from the adjacent bearing 3 in substantially the same manner as heretofor described in connection with the ram 23. Ram 31 is suitably socketed to receive the adjacent end of shaft 5 and is provided with an annular end face similar to the face 28 of ram 23 for engagement with the outer race or cone of bearing 3. The air pressure within the pneumatic cylinder 33 will be regulated in any suitable manner to cause the ram 31 to exert a predetermined thrust against the outer race of bearing 3. Since the rams 23 and 31 will thus thrust in opposite directions against the outer races of their respective bearings 4 and 3 respectively, it will be seen that a thrust load will be imposed on these bearings equal to the pressure exerted by the ram 31, the ram 23 having first been actuated to axially adjust the bearings 4 and 3 and shaft 5 to the extent permitted by the gauge 29. It is of importance that the thrust exerted by the ram 23 be regulated through control of the fluid pressure within the cylinder 25 or otherwise so as to always be greater than the thrust exerted by the loading ram 31 whereby the loading ram will not disturb the axial adjustment effected by operation of the adjusting ram 23.

It will be seen that by actuaing the ram 23 and its gauge 29 to dispose the bearings 3 and 4 and shaft 5 in different trial positions and by utilizing the ram 31 to operatively load the bearings in any of these positions the amount of free movement or back-lash between the gears 8 and 9 may be readily ascertained in any of these positions, and while the bearings are loaded, by measuring the free movement or rotation of the pinion 9 and its shaft 10 in any of these positions. Thus by measuring the back-lash of the shaft 10 with the gear 8 in different positions of axial adjustment a position may be reached in which the free movement or back-lash of shaft 10 is within the proper limits. At such time, by measuring the axial distance between the outer face of each outer bearing race of the bearings 3 and 4 and the respective surrounding faces 30 and 34 on the gear box 2 it will be possible to determine the total thickness of the washers or shims which should be interposed between each such face 30 or 34 and the bearing cap or cover to be applied thereover in the manner indicated in Figure 5 to maintain these bearings in their proper positions and under proper axial thrust load. In order to facilitate such measurement a gauge member in the form of a sleeve 35 is threaded on the ram 31 in the manner shown in connection with the gauge member 29 and its associated ram, whereby the annular end face of the gauge member 35 may be rotated into abutting engagement wtih the flat face or reference surface 14 of the gear box, the gauge member 35 being suitably calibrated as at 36 for cooperation with a stationary reference point 37 on the ram 31 to accurately indicate the axial distance between reference surface 14 and the reference surface or plane defined by the cooperating face of the outer race or cone of bearing 3. The gauge or gauge member 29 of the ram 23 will preferably be similarly calibrated for cooperation with a reference point or indicia on a ring member 38 fixed on the ram 23 and similar to the ring member 39 which carries the indicia or reference point 37 for the ram 31.

In order to facilitate the lost motion or back-lash measurement of the shaft 10 and gear or pinion 9, a socketed fitting 40 removably secured on the end of shaft 10 as by means of a set screw 41 (Figure 8) may carry an axially projecting pin 42 rotatable with the shaft 10 into engagement with the spring projected actuating plunger 43 of a suitable measuring instrument 44. The arrangement is such that the shaft 10 may be rotated to bring the pin 42 into engagement with the actuating plunger 43 of the measuring instrument or gauge 44, the plunger 43 being spring projected as abovementioned to maintain engagement with the pin 42 during rocking of the shaft 10 so that manual rocking of the shaft 10 within the range of its lost motion or back-lash will permit accurate measurement of such range of lost motion on the indicating dial of the measuring instrument 44. It is found that in actual practice the limits of the lost motion or free oscillation of the shaft 10 may be readily sensed by an operator in manually oscillating the shaft 10. It is desirable, of course, to make such back-lash measurements in several different positions of relative rotation as between the pinion 9 and gear 8 to be sure that their proper range of free movement or backlash may be obtained in each of these several different positions. Where the number of teeth on the gear 8 greatly exceed those on the pinion 9 as in the instant case, it has been found convenient to measure the back-lash of shaft 10 at the end of each of several successive complete revolutions of the shaft 10, each of which obviously serves to engage the pinion 9 at relatively different points around the circumference of the gear 8. For the purpose of facilitating such successive revolutions of the shaft 10 the socketed fitting 40 has fixed thereto a driven clutch portion or member 45 having a clutch arm 46 medially pivoted thereon as at 47 for radial swinging movement into or out of engagement with a driving abutment or projection 48 on a driving clutch member 49 keyed on the drive shaft 50 of a suitable electric motor 51 shown in Figures 1 and 2.

Preferably the motor 51 is mounted in a cradle 52 supported in bearings 53 and 53' respectively for swinging movement about the axis of the motor shaft 50, the cradle 52 being supported in bearing 54 by means of a hollow trunnion 58 shown in Figure 8 whereby the shaft 50 and clutch member 49 thereon may be disposed coaxially through said trunnion 58 and its supporting bearing 53'. The center of gravity of the cradle 52 and motor 51 lies below the axis of the motor shaft 50 so that the driving torque of the motor imparted to the shaft 10 through the clutch members 49 and 45 may be measured by a pointer 54 carried by the cradle 52 for cooperation with a suitably calibrated dial 55 as shown in Figure 4. By observing the reading of the pointer 54 on the dial 55 the operator may observe whether or not there is any binding resulting from any cause whatsoever, as for instance, improper cooperation between the gears 8 and 9 or improper loading or positioning of the bearings 3 and 4 such as might result from improper functioning of the rams 23 or 31 or their associated pneumatic actuating mechanism.

It will be seen that the clutch arm 46 is normally biased toward a radially inwardly swung and axially projecting operative position for engagement with the driving clutch abutment 48 by means of a tension spring 56 connected between the arm 46 and clutch member 45 as best shown in Figure 8. The rear end of the clutch arm 46 is adapted, as by the provision of a roller 57 thereon, for engagement with a stop element or cam 58 carried by a plunger 59 moveable through a guide 60 substantially radially to the rotational axis of the shaft 10 and clutch member 45. The arrangement is such that when the plunger 59 is moved radially inwardly to operative position the stop member 58 is disposed in the path of rotation of the rear end of the arm 46 which carries the roller so that the ensuing engagement between the roller and the stop member or cam 58 will swing the arm 46 so as to disengage it from the driving abutment 48, while, at the same time this engagement will serve as a brake to bring the shaft 10 to a position of rest in a predetermined attitude of rotation. Thus the cam or stop 58 serves both as a clutch control element and also as a brake. If desired, the rear end of the plunger 59 may be connected through a toggle linkage 61, 62 to the same bracket 63 which provides a support for the bearing or guide 60 through which the plunger 59 moves. The toggle link 62 may be formed as a bell crank lever having a control handle 64 fixed to an upwardly projecting arm thereof as shown, whereby the knee 65 of the toggle linkage 61, 62 may be moved upwardly from its substantially dead center position to retract the cam element 58 when desired or else may be moved to its substantially dead center position against a suitable stop 66 on bracket 63 to project the cam 58 into operative engagement with the clutch arm 46 whereby to disengage same from its cooperating driving abutment 48.

Preferably the measuring instrument or gauge 44 will be supported by a rigid arm 67a in a bracket 67b which in turn is carried on a plunger or slide 67 moveable through a guide 68 and actuated through a toggle linkage 69, 70 and control lever 71 in substantially the same manner as the plunger 59. This permits withdrawing the measuring instrument 44 from the path of rotation of the axially projecting pin 42 to thus avoid possibility of damage to the actuating plunger 43 of the measuring instrument. Preferably the control handles 59 and 71 are interconnected through laterally projecting abutments 72 and 73 carried by their respective handles or levers 59 and 71 whereby upward swinging of the handle 64 to engage the clutch arm with the driving abutment 48 and institute rotational movement of the shaft 10 will actuate the control arm or lever 71 to retract the measuring instrument 44. To this end it will be noted that the abutment 72 projects beneath the abutment 73 of the operating handle 71 to engage said abutment 73 and raise the operating handle 71 with the handle 64.

In the operation of the complete machine a gear box 2 having its contents approximately positioned therein is secured within the workholding means of the machine as defined by the standard 18, block 20 and their associated securing screws 19 and 22 respectively, the rams 23 and 31 being at this time fully retracted and the measuring instrument 44 and clutch control cam 58 similarly being retracted to inoperative position to avoid interference with such positioning of the gear box 2. With the gauge or gauge member 29 of the adjusting ram 23 positioned at a trial setting which is preferably approximately the average setting or measurement found to be correct in previous operations on similar gear boxes, the controls for the hydraulic cylinder 25 are then actutaed in appropriate manner to bring the ram 23 into thrusting engagement with the outer race of the bearing 4 to adjust it and the shaft 5 axially within the gear box 2 to the full extent permitted by the engagement of the gauge 29 with the reference face or surface 30 of the gear box 2 immediately surrounding the bearing 4. The ram 31 is then caused to move into operating engagement with the outer race or cone of the bearing 3 in order to apply a predetermined load or thrust to the bearings 3 and 4. Then with the bearings 3 and 4 thus adjusted and loaded in a trial position, the socketed fixture 40 with its associated clutch member 45 having in the meantime been secured on the end of shaft 10 will be rotated by the motor 51 and the torque measuring device or pointer 54 will be observed to ascertain that the torque transmitted by the motor is not abnormal such as would indicate possible binding or jamming of the parts within the gear box 2.

The clutch control cam 58 is then projected to operative position through actuation of its control handle 64 to engage the clutch arm 46 and bring the shaft 10 to a stop in a predetermined position of rotation, whereupon the measuring instrument 44 is projected to operative position through suitable actuation of its control handle 71. Thereupon the shaft 10 is manually oscillated or in other words, is grasped by the operator and rocked back and forth throughout the range permitted by its free movement or back-lash, and the range of such oscillation is indicated on the dial of the measuring instrument 44 by means of the hand 44a in conjunction with the calibrations 44b as best shown in Figure 8. If such range of lost motion or back-lash is either too large or too small the rams 23 and 31 may be retracted by operation of their respective pneumatic cylinders and the gauge member 29 of the adjusting ram 23 reset to place the shaft 5 with its associated bearings and gear 8 in a neutral position. Thereupon, after again moving the ram 31 into operative position, the back-lash is again measured and this is continued until the proper back-lash range is indicated on the measuring instrument 44. When a proper back-lash range is indicated, the measurement is preferably repeated in several different positions of engagement between the pinion 9 and gear 8, these being preferably spaced apart to the extent of successive revolutions of the pinion 9 and its shaft 10 as determined by the clutch control cam 58 in conjunction with the clutch arm 46 and its associated driving abutment 48.

When these several back-lash measurements are found to fall within the required range, the reading of the gauge 29 is then noted. Also, the gauge 35 is then rotated into operative engagement with the face 14 of the gear box 2 and its reading then noted. Preferably the operator after noting these readings will chalk them or otherwise mark them directly on the exterior of the gear box 2 so that the workmen in applying the bearing caps or covers as illustrated in Figure 5 may be informed as to the exact thickness of shims or washers 15 to be interposed between each cover 13 and the gear box 2.

In this application there is shown and described only the preferred embodiment of the invention simply by way of illustration of the preferred mode contemplated by me of carrying out the invention. However, it is recognized that the invention may be modified in various ways and the several details thereof changed in different respects, all without departing from the said invention.

Accordingly, the drawings and description herein are to be considered as merely illustrative in nature and not as exclusive.

Having thus described the invention, I claim:

1. A machine for axially adjusting and loading the opposed relatively fixed bearings of the gear shaft within a gear box whereby a beveled gear on said shaft may be accurately positioned in cooperative relation with a beveled pinion in said gear box comprising, positioning means for securing the gear box against movement, adjusting means on one side of said positioning means for thrusting axially against and adjusting one of the relatively axially fixed supporting bearings of a gear shaft within said box, gauge mechanism carried by said adjusting means and adjustable relative thereto in the direction of thrust of said means for limiting said adjustment and for measuring the axial distance between the adjusting means and said gear box respectively in the adjusted position of the bearing, loading means on the opposite side of said positioning means for exerting a predetermined axial thrust against another of the gear shaft bearings in opposition to, but of lesser extent than, the thrust of said adjusting means, and gauge mechanism carried by said loading means and adjustable relative thereto in the direction of thrust of the loading means for measuring the distance between the loading means and the gear box.

2. The combination of claim 1 including means cooperating with said pinion to measure the back-lash between said pinion and the said gear in any of the positions of axial adjustment of the latter.

3. A machine for axially adjusting and loading the opposed relatively fixed bearings of a gear shaft within a gear box, whereby a beveled gear on said shaft may be accurately positioned in cooperative relation with a beveled pinion in the gear box comprising, positioning means for securing the gear box against movement, adjusting means on one side of said positioning means for thrusting axially against and adjusting one of the relatively axially fixed supporting bearings of a gear shaft within said box, gauge mechanism carried by said adjusting means for gauging movement relative thereto in the direction of said thrust, and loading means on the opposite side of said positioning means for exerting a predetermined axial thrust against another of the gear shaft bearings in opposition to, but of lesser extent than, the thrust of said adjusting means.

4. Gear box adjusting and measuring mechanism comprising positioning means for securing a gear box against movement, adjusting means on one side of said positioning means thrusting axially against and axially adjusting one of the supporting bearings of a shaft journaled in said gear box, gauge mechanism carried by and adjustable in the direction of thrust of said adjusting means for limiting said adjustment by engagement with the gear box and for measuring the axial distance between said adjusting means and the gear box respectively, loading means on the opposite side of said positioning means aligned with said adjusting means for exerting a predetermined axial thrust against another of the bearings supporting said gear shaft in opposition to, but of lesser extent than the thrust of said adjusting means, and gauge mechanism carried by said loading means for measuring the axial distance between said loading means and the gear box.

5. Mechanism of the character described comprising a workholder, bearing adjusting and loading rams respectively disposed on opposite sides of said workholder for relatively aligned rectilinear movement, means for urging said loading ram toward said adjusting ram with a predetermined constant degree of thrust, means for urging said adjusting ram toward the loading ram with a degree of thrust greater than that of said loading ram, said rams being adapted for operative engagement respectively with axially aligned bearings in opposite sides of a gear box positioned in said workholder, gauge means being carried by said adjusting ram and adjustable relative thereto in the direction of thrust of said adjusting ram to restrict the adjusting movement thereof relative to the gear box by abutment with the gear box.

6. Mechanism of the character described comprising a workholder, bearing adjusting and loading rams respectively disposed on opposite sides of said workholder for relatively aligned rectilinear movement, means for urging said loading ram toward said adjusting ram with a predetermined constant degree of thrust, means urging said adjusting ram toward the loading ram with a degree of thrust greater than that of said loading ram, said rams being adapted for operative engagement respectively with axially aligned bearings in opposite sides of a gear box positioned in said workholder.

7. The combination of claim 5 wherein said gauge means comprises a sleeve threaded externally on said adjusting ram and projecting forwardly of the operative face thereof for engagement with a gear box to limit the adjusting movement of said ram.

8. The combination of claim 5 including adjustable gauge means carried by said loading ram and adjustable relative to said loading ram in the direction of thrust thereof for measuring the axial distance between reference surfaces on the gear box and on the bearing engaged by said arm respectively.

9. Mechanism for measuring the back-lash of a pinion in different predetermined positions of mesh with a gear comprising a driven clutch member removably associated with said pinion for rotation therewith, a driving clutch member disposed in coaxial alignment with said driven member and means driving said driving member, said driving member having a radial driving abutment, said driven member having a clutch arm medially pivoted thereon for radial swinging movement, resilient means normally swinging said clutch arm to a position wherein one end thereof projects axially for operative driven engagement with said driving abutment, a roller being carried by the other end of said clutch arm, a control cam and means supporting same for generally radial movement into and out of a position to engage said roller and swing said clutch arm out of engagement with said driving abutment, a control lever being operatively connected to said cam to control its movement, in combination with a gauge normally supported adjacent said driven clutch, said gauge having a spring projected gauging element, a gauge actuating projection rotatable with said driven clutch member to operatively engage said gauging element, a radially retractible slide supporting said gauge for movement out of the path of rotation of the said actuating projection, control means for said slide, and means interconnecting said control means to said control lever to retract said slide and gauge as the control lever is actuated to engage said clutch.

References Cited in the file of this patent
UNITED STATES PATENTS

| | | |
|---|---|---|
| 1,209,377 | Baker | Dec. 19, 1916 |
| 1,233,014 | Baker | July 10, 1917 |
| 1,856,944 | Blomstrom | May 3, 1932 |